United States Patent
Hong

(10) Patent No.: US 11,724,567 B2
(45) Date of Patent: Aug. 15, 2023

(54) METHOD OF CONTROLLING AUTOMOTIVE HEATING, VENTILATION, AND AIR CONDITIONING SYSTEM

(71) Applicants: Hyundai Motor Company, Seoul (KR); Kia Corporation, Seoul (KR)

(72) Inventor: Gyu Sik Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 10 days.

(21) Appl. No.: 17/521,970

(22) Filed: Nov. 9, 2021

(65) Prior Publication Data
US 2022/0324291 A1 Oct. 13, 2022

(30) Foreign Application Priority Data
Apr. 6, 2021 (KR) .................. 10-2021-0044833

(51) Int. Cl.
*B60H 1/00* (2006.01)
*B60S 1/02* (2006.01)
*B60S 1/54* (2006.01)

(52) U.S. Cl.
CPC .......... *B60H 1/00842* (2013.01); *B60S 1/026* (2013.01); *B60S 1/54* (2013.01)

(58) Field of Classification Search
CPC ........ B60S 1/026; B60S 1/54; B60H 1/00642; B60H 1/00664; B60H 1/0073; B60H 1/00735; B60H 1/00785; B60H 1/00814–00842; B60H 1/00864; B60H 1/00892
See application file for complete search history.

(56) References Cited

U.S. PATENT DOCUMENTS 4,697,734 A * 10/1987 Ueda .................. G05D 23/1917
165/200
2014/0087644 A1* 3/2014 Watanabe ............... B60S 1/023
454/75

* cited by examiner

*Primary Examiner* — Edelmira Bosques
*Assistant Examiner* — Michael James Giordano
(74) *Attorney, Agent, or Firm* — Fox Rothschild LLP

(57) ABSTRACT

A method of controlling an automotive heating, ventilation, and air conditioning (HVAC) system includes steps of: comparing, by a controller, a voltage applied to a mode door actuator with a first operating voltage, a second operating voltage, and a third operating voltage when a driving condition of a vehicle meets an external condensation occurrence condition; and controlling, by the controller, a defrost mode door to close a defrost outlet or adjust an opening degree of the defrost outlet to be less than a reference opening degree when the voltage applied to the mode door actuator is greater than or equal to the first operating voltage, where the defrost outlet directs air toward a front windshield, and the reference opening degree is an opening degree of the defrost outlet which has been set when the driving condition of the vehicle does not meet the external condensation occurrence condition.

10 Claims, 5 Drawing Sheets

METHOD OF CONTROLLING AUTOMOTIVE HEATING, VENTILATION, AND AIR CONDITIONING SYSTEM

CROSS-REFERENCE TO RELATED APPLICATION

This application claims under 35 U.S.C. § 119(a) the benefit of Korean Patent Application No. 10-2021-0044833, filed on Apr. 6, 2021 in the Korean Intellectual Property Office, the entire contents of which are incorporated by reference herein.

BACKGROUND

(a) Technical Field

The present disclosure relates to a method of controlling an automotive heating, ventilation, and air conditioning (HVAC) system, more particularly, to the method of controlling the automotive HVAC system capable of preventing condensation on an outside of a vehicle.

(b) Description of the Related Art

It is known to provide heating, ventilation, and air conditioning (HVAC) systems in vehicles. These HVAC systems may heat and cool air within a passenger compartment of a vehicle for the comfort of vehicle passengers. In addition, some automotive HVAC systems may be selectively configured to change the source of air. In one configuration, the HVAC system draws in fresh air from outside the vehicle, conditions the air, and then circulates the conditioned air into the passenger compartment. In another configuration, the HVAC system draws in a mixture of outdoor air and indoor air, conditions the mixed air, and then pumps the conditioned air into the passenger compartment.

The automotive HVAC system includes an evaporator, a heater core, and an air mixing door within a casing. The casing has an inlet through which the air is allowed to draw in, and a plurality of outlets through which the air is directed into the passenger compartment. The evaporator cools the air, and the heater core heats the air entering the passenger compartment. The air mixing door (also referred to as the "temperature door") is disposed between the evaporator and the heater core. The evaporator is located upstream of the air mixing door, and the heater core is located downstream of the air mixing door. The air mixing door is configured to adjust the flow rate of air passing through the heater core, thereby adjusting the temperature of the air entering the passenger compartment.

In a high-temperature and high-humidity condition outside the vehicle, the automotive HVAC system may operate in a cooling mode under the control of a controller. During the cooling operation of the HVAC system, when low-temperature and low-humidity air is directed toward the front windshield, high-temperature and high-humidity air which is present outside the vehicle condenses on the exterior of the vehicle's front windshield due to the low-temperature and low-humidity air, resulting in condensation on the outside of the vehicle. The external condensation may interfere with the driver's visibility, which may lead to an accident.

The automotive HVAC system may operate in various air distribution modes. The air distribution modes may be divided into a vent mode, a bi-level mode, a defrost mode, a floor mode, a mix mode, and the like. In the vent mode, the air is directed toward the passenger's face and chest. In the bi-level mode, the air is directed toward the passenger's face and the floor of the vehicle. In the defrost mode, the air is directed toward the front windshield of the vehicle. In the floor mode, the air is directed toward the floor and front windshield of the vehicle, and the flow rate of air toward the floor of the vehicle is higher than the flow rate of air toward the front windshield. In the mix mode, the air is directed toward the floor and front windshield of the vehicle, and the flow rate of air toward the floor of the vehicle is similar to the flow rate of air toward the front windshield.

In the vent mode and the bi-level mode, the air is not directed toward the front windshield, so the possibility of external condensation may be low. In the defrost mode, the floor mode, and the mix mode, however, the air is directed toward the front windshield, causing external condensation. According to the related art, a method for removing external condensation is used by increasing the temperature of the air directed toward the front windshield or blocking the flow of the air toward the front windshield. However, as the indoor temperature in the passenger compartment is relatively high, the cooling performance of the passenger compartment may deteriorate and the comfort of passengers in the passenger compartment may be reduced.

The above information described in this background section is provided to assist in understanding the background of the inventive concept, and may include any technical concept which is not considered as the prior art that is already known to those skilled in the art.

SUMMARY

An aspect of the present disclosure provides a method of controlling an automotive heating, ventilation, and air conditioning (HVAC) system capable of preventing or minimizing external condensation without degrading a cooling performance of a passenger compartment when a vehicle operates/drives in a condition in which external condensation occurs.

According to an aspect of the present disclosure, a method of controlling an automotive HVAC system may include: comparing, by a controller, a voltage applied to a mode door actuator with a first operating voltage, a second operating voltage, and a third operating voltage when a driving condition of a vehicle meets an external condensation occurrence condition; and controlling, by the controller, a defrost mode door to close a defrost outlet or adjust an opening degree of the defrost outlet to be less than a reference opening degree when the voltage applied to the mode door actuator is greater than or equal to the first operating voltage. The first operating voltage may be less than the second operating voltage, and the second operating voltage may be less than the third operating voltage. The defrost outlet may be configured to direct air toward a front windshield of the vehicle, the defrost mode door may adjust the opening degree of the defrost outlet, the mode door actuator may actuate the defrost mode door, and the reference opening degree may be an opening degree of the defrost outlet which has been set when the driving condition of the vehicle does not meet the external condensation occurrence condition.

The method may further include controlling, by the controller, the defrost mode door to close the defrost outlet when the voltage applied to the mode door actuator is greater than or equal to the first operating voltage and is less than the second operating voltage.

The method may further include setting a target temperature of an evaporator to be less than a reference target temperature, wherein the reference target temperature refers to a target temperature of the evaporator which has been set when the driving condition of the vehicle does not meet the external condensation occurrence condition.

The method may further include setting a voltage applied to an air blower to be greater than a reference voltage, wherein the reference voltage may be applied to the air blower when the driving condition of the vehicle does not meet the external condensation occurrence condition.

The method may further include controlling, by the controller, the defrost mode door to adjust the opening degree of the defrost outlet to be less than the reference opening degree when the voltage applied to the mode door actuator is greater than or equal to the second operating voltage and is less than the third operating voltage.

The method may further include setting a voltage applied to an air blower to be greater than a reference voltage, wherein the reference voltage may be applied to the air blower when the driving condition of the vehicle does not meet the external condensation occurrence condition.

The method may further include: detecting, by the controller, whether a windshield wiper is manually operated; and controlling, by the controller, the windshield wiper to automatically operate at a first time interval when it is detected that the windshield wiper is manually operated.

The method may further include controlling, by the controller, a floor mode door and the defrost mode door to adjust an opening degree of a floor outlet to be less than the opening degree of the defrost outlet when the voltage applied to the mode door actuator is greater than or equal to the third operating voltage. The floor outlet may be configured to direct the air toward a floor of the vehicle, the floor mode door may adjust the opening degree of the floor outlet, and the mode door actuator may actuate the floor mode door.

The method may further include setting a voltage applied to an air blower to be greater than a reference voltage, wherein the reference voltage may be applied to the air blower when the driving condition of the vehicle does not meet the external condensation occurrence condition.

The method may further include: detecting, by the controller, whether a windshield wiper is manually operated; and controlling, by the controller, the windshield wiper to automatically operate at a second time interval when it is detected that the windshield wiper is manually operated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
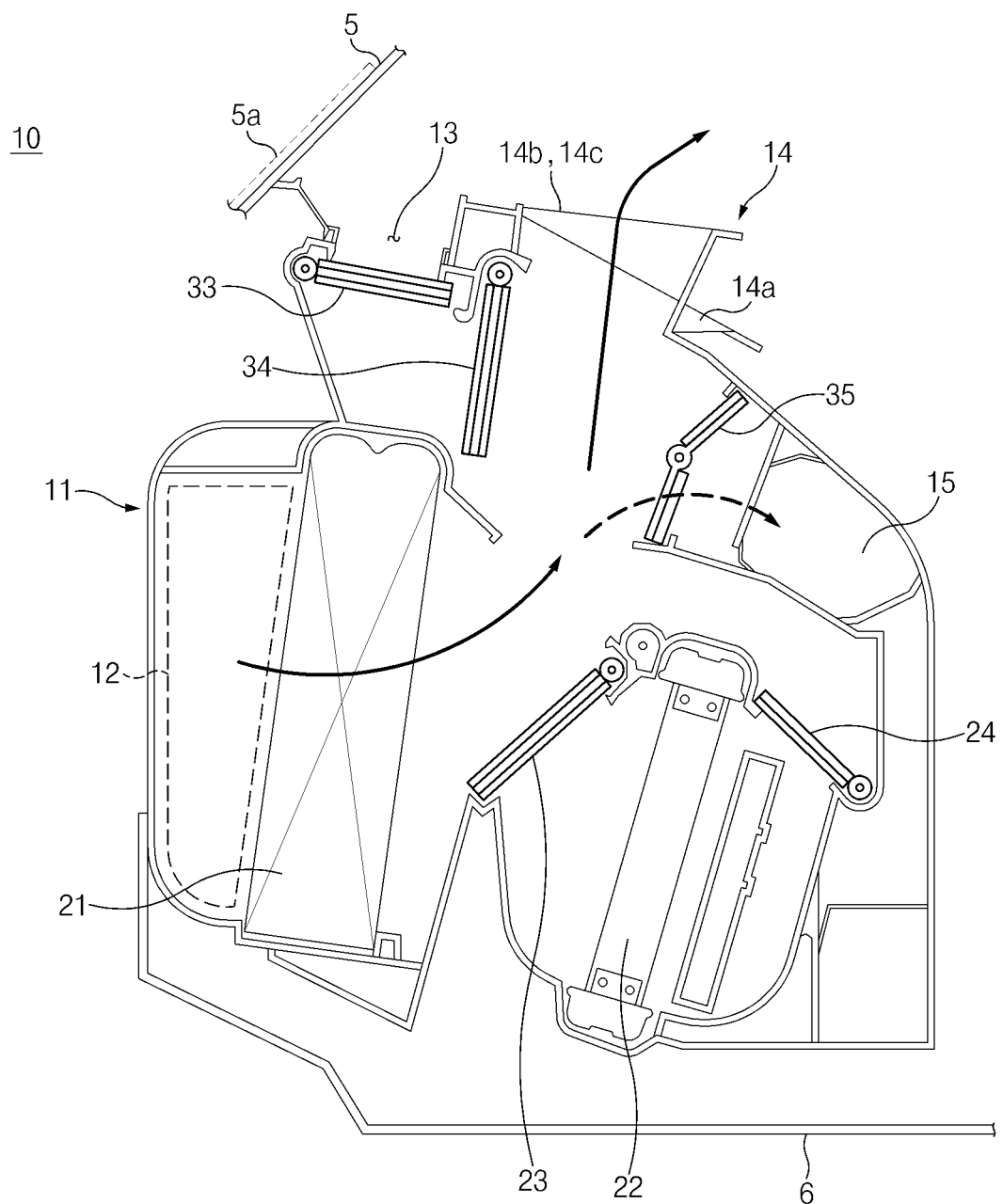
FIG. 1 illustrates a cross-sectional view of an automotive heating, ventilation, and air conditioning (HVAC) system according to an exemplary embodiment of the present disclosure, in a state in which air is directed toward a passenger compartment in a vent mode and a bi-level mode.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an automotive heating, ventilation, and air conditioning (HVAC) system 10 according to an exemplary embodiment of the present disclosure may include a casing 11, in which an evaporator 21 and a heater core 22 are contained. The evaporator 21 and the heater core 22 may be sequentially arranged within the casing 11 in an air flow direction from upstream to downstream.

Figure 4:
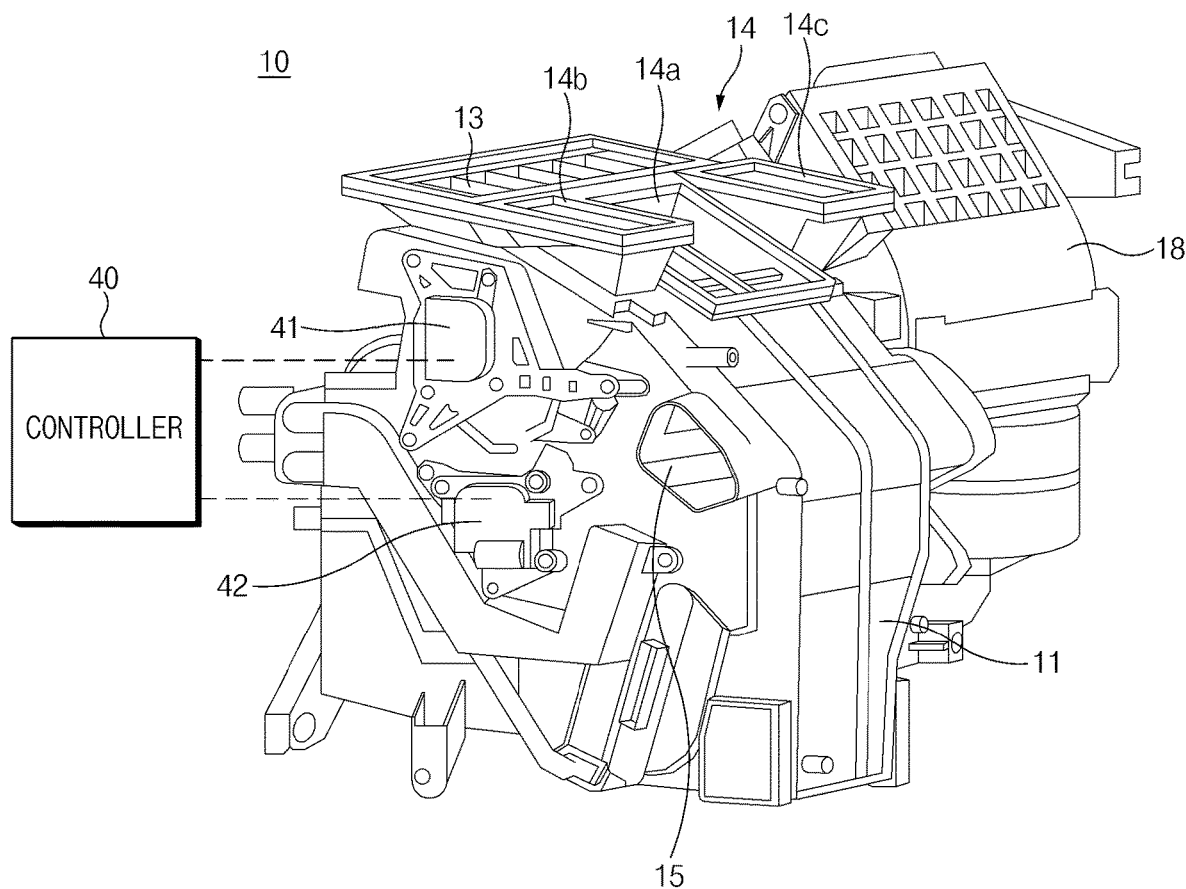
FIG. 4 illustrates a perspective view of an automotive HVAC system according to an exemplary embodiment of the present disclosure.

The casing 11 may have an inlet 12 through which air is allowed to draw in, and a plurality of outlets 13, 14, and 15 through which the air is directed into a passenger compartment. Referring to FIG. 4, an air blower 18 may be mounted on the casing 11, and the air blower 18 may be connected to the inlet 12. The air blower 18 may blow the air into the casing 11 through the inlet 12. The plurality of outlets 13, 14, and 15 may include a defrost outlet 13 and a vent outlet 14 provided on a top wall of the casing 11, and a floor outlet 15 provided on a rear wall of the casing 11.

The defrost outlet 13 may be configured to direct the air toward a front windshield 5, and thus the air may be directed toward the front windshield 5 through the defrost outlet 13. A defrost mode door 33 may be rotatably mounted in a position adjacent to the defrost outlet 13 within the casing 11. The defrost mode door 33 may adjust the opening degree of the defrost outlet 13 so that the flow or flow rate of air passing through the defrost outlet 13 may be varied.

The vent outlet 14 may be configured to direct the air toward the passenger's face and chest, and thus the air may be directed toward the passenger through the vent outlet 14. Referring to FIG. 4, the vent outlet 14 may include a center vent outlet 14a and a pair of side vent outlets 14b and 14c disposed on both sides of the center vent outlet 14a. A vent mode door 34 may be rotatably mounted in a position adjacent to the vent outlet 14 within the casing 11. The vent mode door 34 may adjust the opening degree of the vent outlet 14 so that the flow or flow rate of air passing through the vent outlet 14 may be varied.

The floor outlet 15 may be configured to direct the air toward a floor 6 of the vehicle, and thus the air may be directed toward the floor 6 of the vehicle through the floor outlet 15. According to an exemplary embodiment, a floor guide duct guiding the air toward the floor 6 of the vehicle may be connected to the floor outlet 15. A floor mode door 35 may be rotatably mounted in a position adjacent to the floor outlet 15 within the casing 11. The floor mode door 35 may adjust the opening degree of the floor outlet 15 so that the flow or flow rate of air passing through the floor outlet 15 may be varied.

The evaporator 21 may be located upstream in the casing 11. In particular, the evaporator 21 may be disposed adjacent to the inlet 12 of the casing 11. The evaporator 21 may be configured to cool the air. According to an exemplary embodiment, the evaporator 21 may constitute a known refrigeration cycle together with a compressor, a condenser, and an expansion valve, and the evaporator 21 may be configured to cool the air using a refrigerant circulated by the operation of the refrigeration cycle.

The heater core 22 may be located downstream of the evaporator 21, and the heater core 22 may be disposed adjacent to the rear wall of the casing 11. According to an exemplary embodiment, the heater core 22 may be configured to heat the air using an engine coolant heated by an engine. According to another exemplary embodiment, the heater core 22 may be configured to heat the air using waste heat generated when electric/electronic components, such as a motor, power converters (an inverter, a converter, etc.), an on-board charger (OBC), and an automated driving controller, are operating. Specifically, the waste heat generated from the electric/electronic components may heat a coolant, and the heater core 22 may be configured to heat the air using the coolant heated by the waste heat. According to another exemplary embodiment, the heater core 22 may be a condenser of the refrigeration cycle, and the heater core 22 may be configured to heat the air as a refrigerant compressed by a compressor is condensed by the heater core 22 during the heating operation of the refrigeration cycle.

The HVAC system 10 may include an air mixing door 23 rotatably (or pivotally) mounted between the evaporator 21 and the heater core 22. As the air mixing door 23 rotates (or pivots) at a predetermined angle, the airflow and the flow rate of air from the evaporator 21 toward the heater core 22 may be adjusted.

In addition, the HVAC system 10 may further include a downstream-side air mixing door 24 rotatably (or pivotally) disposed downstream of the heater core 22. As the downstream-side air mixing door 24 rotates (or pivots) at a predetermined angle, the airflow and the flow rate of air from the heater core 22 toward the outlets 13, 14, and 15 may be adjusted.

When the HVAC system operates in an air conditioning mode (in a cooling mode or a heating mode), the air may be directed into the passenger compartment in various air distribution modes. The air distribution modes may be divided into a defrost mode, a vent mode, a bi-level mode, a floor mode, a mix mode, and the like.

Referring to FIG. 1, most of the air in the vent mode may be directed toward the passenger's face and chest through the center vent outlet 14a and the side vent outlets 14b and 14c of the vent outlet 14. For example, approximately 91% of the air may be directed toward the passenger's face and chest through the center vent outlet 14a and the side vent outlets 14b and 14c of the vent outlet 14, and approximately 9% of the air may be directed toward the floor 6 of the vehicle through the floor outlet 15. That is, a ratio of the opening degree of the vent outlet 14 and the opening degree of the floor outlet 15 may be 91:9.

Referring to FIG. 1, the air in the bi-level mode may be distributed at a predetermined rate through the vent outlet 14 and the floor outlet 15 and be directed toward the passenger and the floor 6 of the vehicle. For example, approximately 65% of the air may be directed toward the passenger's face and chest through the center vent outlet 14a and the side vent outlets 14b and 14c of the vent outlet 14, and approximately 35% of the air may be directed toward the floor 6 of the vehicle through the floor outlet 15 (see a dotted line in FIG. 1). That is, a ratio of the opening degree of the vent outlet 14 and the opening degree of the floor outlet 15 may be 65:35.

Figure 2:
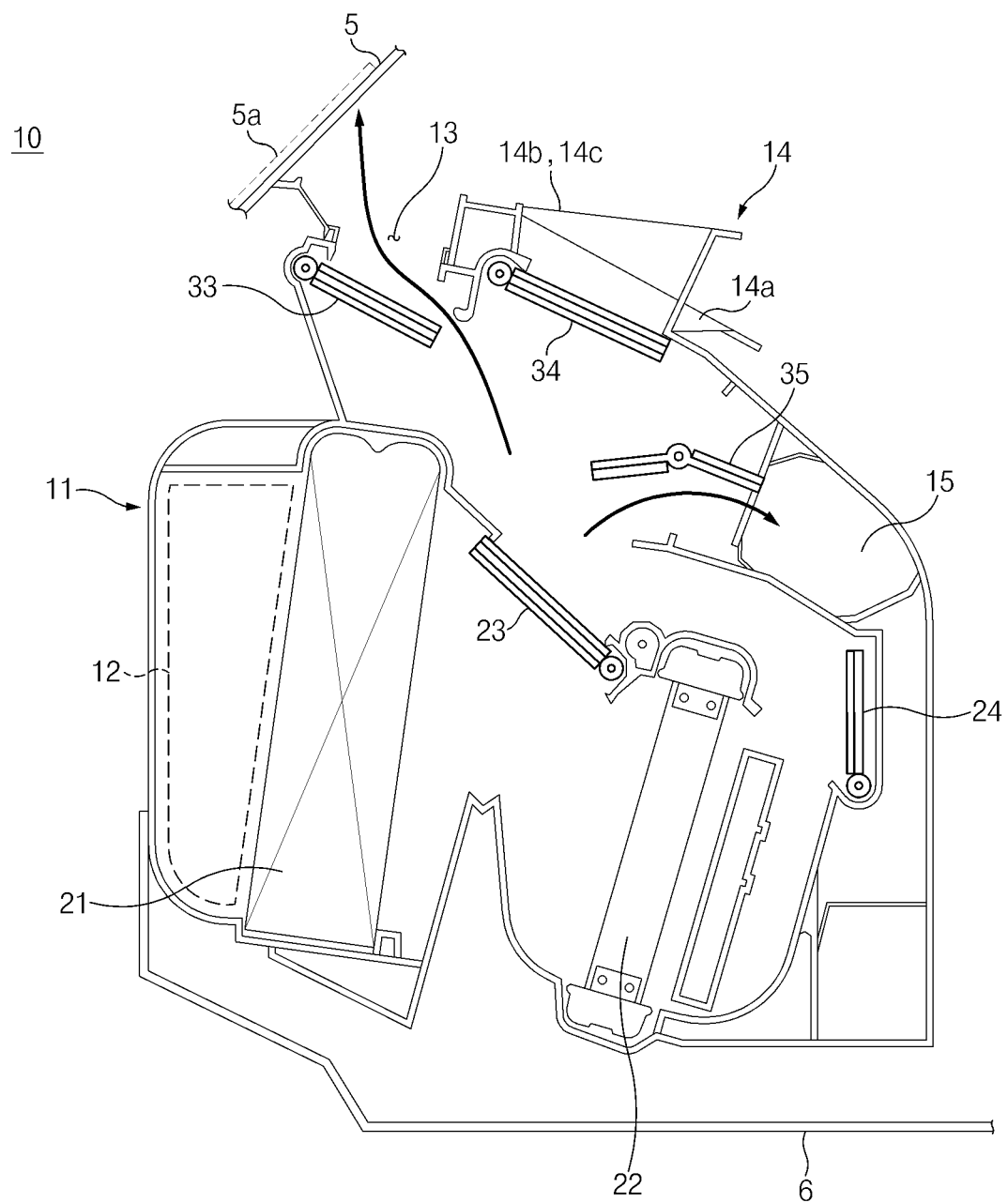
FIG. 2 illustrates a cross-sectional view of an automotive HVAC system according to an exemplary embodiment of the present disclosure, in a state in which air is directed toward a passenger compartment in a floor mode and a mix mode.

Referring to FIG. 2, most of the air in the floor mode may be directed toward the floor 6 and the front windshield 5 of the vehicle through the floor outlet 15 and the defrost outlet 13, and the flow rate of air passing through the floor outlet 15 may be higher than the flow rate of air passing through the defrost outlet 13. For example, approximately 60% of the air may be directed toward the floor 6 of the vehicle through the floor outlet 15, approximately 25% of the air may be directed toward the front windshield 5 through the defrost outlet 13, and approximately 15% of the air may be directed toward the side vent outlets 14b and 14c of the vent outlet 14. That is, a ratio of the opening degree of the floor outlet 15, the opening degree of the defrost outlet 13, and the opening degree of the vent outlet 14 may be 60:25:15.

Referring to FIG. 2, most of the air in the mix mode may be directed toward the floor 6 and the front windshield 5 of the vehicle through the floor outlet 15 and the defrost outlet 13, and the flow rate of air passing through the floor outlet 15 may be slightly higher than or be similar to the flow rate of air passing through the defrost outlet 13. For example, approximately 43% of the air may be directed toward the floor 6 of the vehicle through the floor outlet 15, approximately 42% of the air may be directed toward the front windshield 5 through the defrost outlet 13, and approximately 15% of the air may be directed toward the side vent outlets 14b and 14c of the vent outlet 14. That is, a ratio of the opening degree of the floor outlet 15, the opening degree of the defrost outlet 13, and the opening degree of the vent outlet 14 may be 43:42:15.

Figure 3:
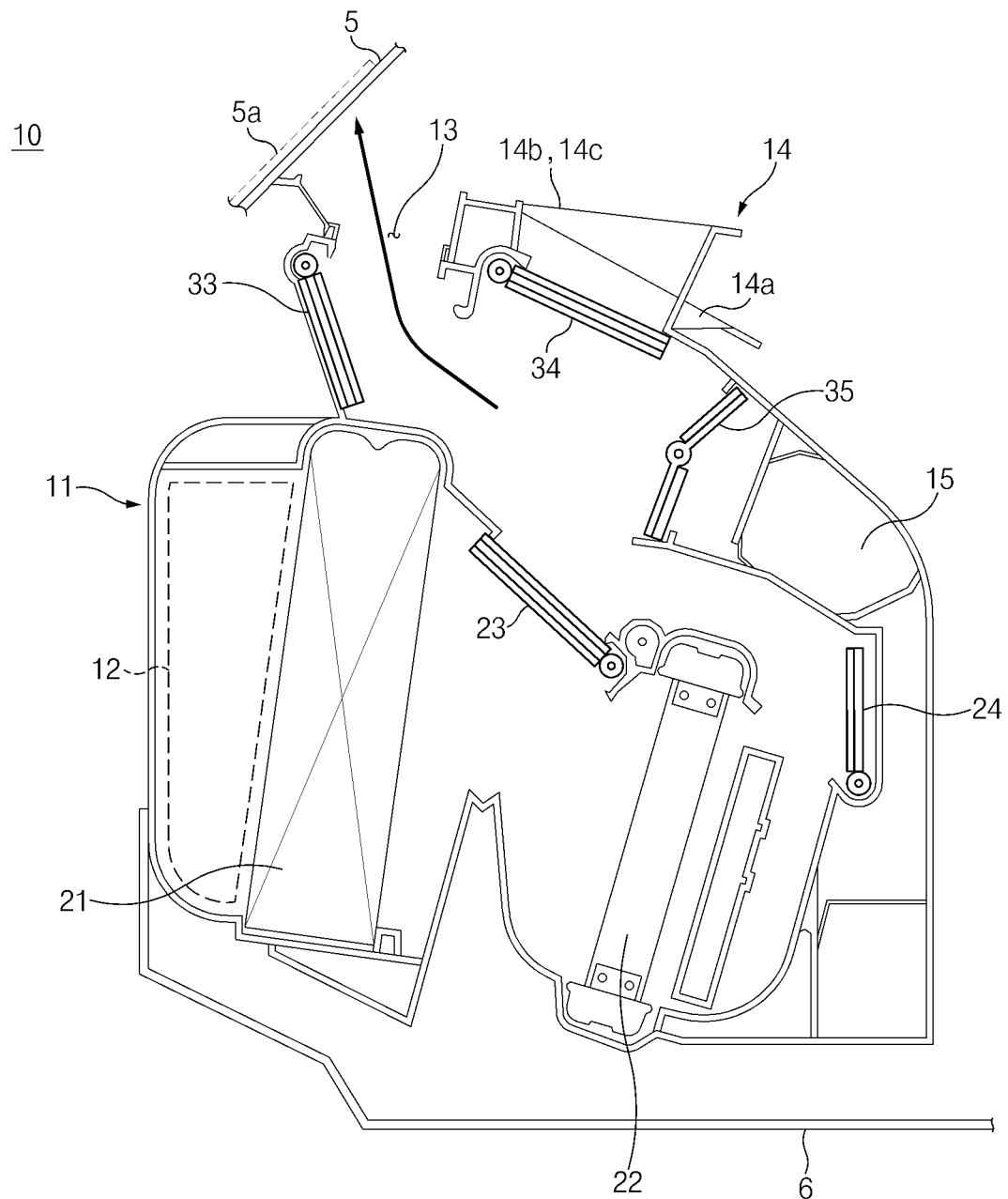
FIG. 3 illustrates a cross-sectional view of an automotive HVAC system according to an exemplary embodiment of the present disclosure, in a state in which air is directed toward a passenger compartment in a defrost mode.

Referring to FIG. 3, most of the air in the defrost mode may be directed toward the front windshield 5 of the vehicle through the defrost outlet 13. For example, approximately 85% of the air may be directed toward the front windshield 5 of the vehicle through the defrost outlet 13, and approximately 15% of the air may be directed toward the passenger's face and chest through the side vent outlets 14b and 14c of the vent outlet 14. That is, a ratio of the opening degree of the defrost outlet 13 and the opening degree of the vent outlet 14 may be 85:15.

Referring to FIG. 4, a mode door actuator 41 and a mixing door actuator 42 may be mounted on the exterior of the casing 11. The mode door actuator 41 may actuate the defrost mode door 33, the vent mode door 34, and the floor mode door 35. For example, the mode door actuator 41 may include a drive motor and a transmission mechanism that transmits a torque of the drive motor to a shaft of each of the mode doors 33, 34, and 35. The mixing door actuator 42 may actuate the air mixing door 23. For example, the mixing door actuator 42 may include a drive motor and a transmission mechanism that transmits a torque of the drive motor to a shaft of the air mixing door 23. The mode door actuator 41 and the mixing door actuator 42 may be controlled by a controller 40.

As described above, in a high-temperature and high-humidity condition outside the vehicle, the HVAC system may operate in the cooling mode under the control of the controller 40. During the cooling operation of the HVAC system, when low-temperature low-humidity air is directed toward the front windshield 5, high-temperature high-humidity air which is present outside the vehicle may condense on the exterior of the front windshield of the vehicle due to the low-temperature low-humidity air, resulting in external condensation.

In the vent mode and in the bi-level mode, the air may not pass through the defrost outlet 13, and thus there is a low possibility of condensation which is caused when the high-temperature high-humidity air condenses on the exterior of the front windshield 5 due to the low-temperature low-humidity air in the passenger compartment. In the defrost mode, the floor mode, and the mix mode, however, at least a portion of the air may be directed toward the front windshield 5, which may cause condensation on the outside of the vehicle. According to an exemplary embodiment of the present disclosure, when the HVAC system 10 operates in the cooling mode under the high-temperature and high-humidity condition, the flow of low-temperature low-humidity air toward the front windshield 5 may be blocked or minimized by preventing the air from being directed toward the front windshield 5 of the vehicle through the defrost outlet 13 or relatively reducing the opening degree of the defrost outlet 13 in the defrost mode, the floor mode, and/or the mix mode. By blocking the high-temperature high-humidity air from condensing on the exterior of the front windshield 5 of the vehicle due to the low-temperature low-humidity air, the occurrence of external condensation may be prevented. At the same time, in order to prevent the indoor temperature in the passenger compartment from increasing relatively as the air is not directed toward the passenger compartment through the defrost outlet 13, RPM of the air blower 18 may be temporarily increased and the flow rate of air cooled by the HVAC system 10 may be relatively increased, and thus the cooling performance of the passenger compartment may be prevented from deteriorating.

Figure 5:
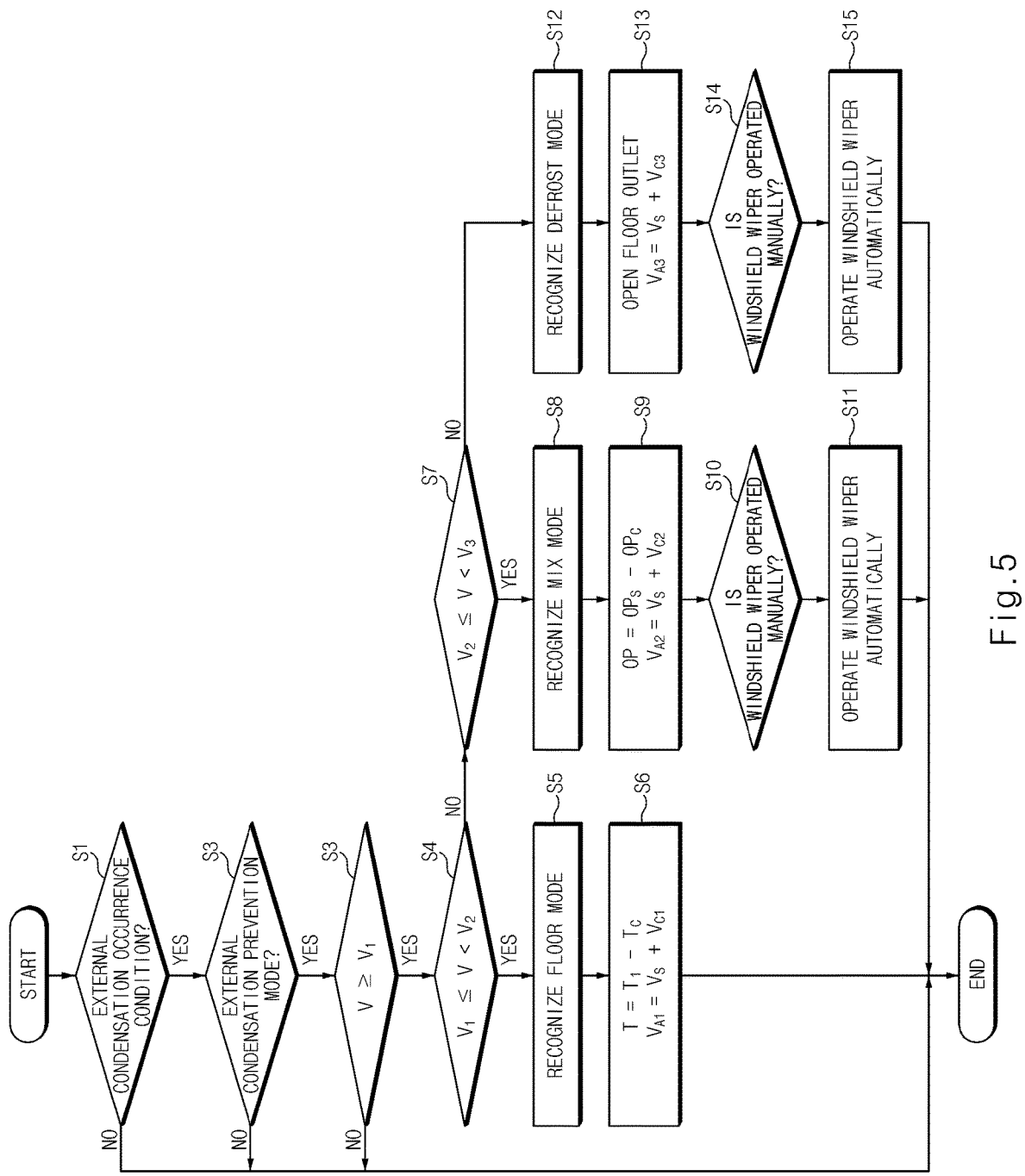
FIG. 5 illustrates a flowchart of a method of controlling an automotive HVAC system according to an exemplary embodiment of the present disclosure.

FIG. 5 illustrates a flowchart of a method of controlling an automotive HVAC system according to an exemplary embodiment of the present disclosure.

The controller 40 may determine whether a driving condition of the vehicle and/or a external condition of the vehicle meets a condition (hereinafter referred to as the "external condensation occurrence condition") in which external condensation occurs (S1). According to an exemplary embodiment, the external condensation occurrence condition refers to the following condition: an outdoor temperature is higher than a reference temperature; a vehicle speed is lower than a reference vehicle speed; a solar radiation quantity is less than a reference solar radiation quantity; and the HVAC system 10 is turned on. The reference temperature may be a lower limit temperature at which external condensation is likely to occur. For example, the reference temperature may be 20° C. The reference vehicle speed may be an upper limit speed at which external condensation is likely to occur. For example, the reference vehicle speed may be 50 KPH. The reference solar radiation quantity may be an upper limit temperature at which external condensation is likely to occur. For example, the reference solar radiation quantity may be 500 W.

When a driving condition of the vehicle meets the external condensation occurrence condition, it may be determined whether the operation of the HVAC system 10 is controlled in an external condensation prevention mode (S2). Specifically, when a cooling operation of the HVAC system 10 is set in a state in which the driving condition of the vehicle meets the external condensation occurrence condition, the controller 40 may determine that the HVAC system 10 is controlled in the external condensation prevention mode. In the external condensation prevention mode, the controller 40 may control the HVAC system 10 to prevent or minimize the occurrence of external condensation when the automotive HVAC system 10 operates in the cooling mode under the external condensation occurrence condition.

The controller 40 may determine whether a voltage V applied to the mode door actuator 41 is greater than or equal to a first operating voltage $V_1$ (S3). When the voltage V applied to the mode door actuator 41 is greater than or equal to the first operating voltage $V_1$, it may be determined that the HVAC system 10 operates in any one mode of the floor mode, the mix mode, and the defrost mode. In the floor mode, the mix mode, and the defrost mode, the defrost mode door 33 may be at least partially opened so that at least a portion of the air may be directed toward the front windshield 5 through the defrost outlet 13. When the HVAC system 10 operates in the cooling mode, low-temperature low-humidity air may be directed toward the front windshield 5, and accordingly high-temperature high-humidity air which is present outside the vehicle may condense on the exterior of the front windshield 5, resulting in a high possibility of external condensation.

The first operating voltage $V_1$ may be a voltage for determining whether the HVAC system 10 operates in any one mode of the floor mode, the mix mode, and the defrost mode. When the voltage V applied to the mode door actuator 41 reaches the first operating voltage $V_1$, the defrost outlet 13 may be at least partially opened. For example, the first operating voltage $V_1$ may be 1.1 V.

When the voltage V applied to the mode door actuator 41 is less than the first operating voltage $V_1$ in S3, it may be determined that the HVAC system 10 operates in any one mode of the vent mode and the bi-level mode. In the vent mode and the bi-level mode, the defrost mode door 33 may be closed so that the air may not be directed toward the front windshield 5 through the defrost outlet 13. When the HVAC system 10 operates in the cooling mode, the low-temperature low-humidity air may not be directed toward the front windshield 5, and accordingly it may be unlikely that the high-temperature high-humidity air will condense on the exterior of the front windshield 5. Thus, there is little possibility of external condensation.

When it is determined that the voltage V applied to the mode door actuator 41 is greater than or equal to the first operating voltage $V_1$ in S3, the controller 40 may determine whether the voltage V applied to the mode door actuator 41 is greater than or equal to the first operating voltage $V_1$ and is less than a second operating voltage $V_2$ (S4). The second operating voltage $V_2$ may be a voltage for determining the floor mode. For example, the second operating voltage $V_2$ may be 3.0 V.

When the voltage V applied to the mode door actuator 41 is greater than or equal to the first operating voltage $V_1$ and is less than the second operating voltage $V_2$, the controller 40 may recognize that the HVAC system 10 operates in the floor mode (S5).

After the HVAC system 10 is recognized as operating in the floor mode, the controller 40 may close the defrost outlet 13, lower a target temperature of the evaporator 21, and increase a voltage applied to the air blower 18 (S6), thereby controlling the HVAC system 10 to operate in a modified floor mode. The controller 40 may control the defrost mode door 33 to close the defrost outlet 13, thereby blocking the air from being directed toward the front windshield 5 of the vehicle through the defrost outlet 13. That is, as the air is blocked from being directed toward the front windshield 5, the high-temperature high-humidity air which is present outside the vehicle may be prevented from condensing on the exterior of the front windshield 5, and thus the occurrence of external condensation may be prevented. As the defrost outlet 13 is closed and the flow rate of air directed into the passenger compartment is relatively reduced, an indoor temperature in the passenger compartment may rise above a set cooling temperature. That is, the indoor temperature in the passenger compartment may not be kept at the set cooling temperature. To cope with this, the controller 40 may lower the target temperature of the evaporator 21 and increase the voltage applied to the air blower 18 to increase the RPM of the air blower 18 so that the indoor temperature in the passenger compartment may be kept at the set cooling temperature. Specifically, the controller 40 may reset a target temperature T of the evaporator 21 to be lower than a reference target temperature $T_1$. The reference target temperature $T_1$ refers to a target temperature of the evaporator 21 which has been set when the driving condition of the vehicle does not meet the external condensation occurrence condition. The controller 40 may reset the target temperature T of the evaporator 21 by subtracting a compensation temperature $T_C$ from the reference target temperature $T_1$ ($T=T_1-T_C$). The compensation temperature $T_C$ may be set based on the indoor temperature of the passenger compartment that has risen as the defrost outlet 13 is closed. For example, the compensation temperature $T_C$ may be 1.0° C. The controller 40 may reset a voltage $V_{A1}$ applied to the air blower 18 to be greater than a reference voltage $V_S$, and accordingly the RPM of the air blower 18 may be increased. The reference voltage $V_S$ may be applied to the air blower 18 when the driving condition of the vehicle does not meet the external condensation occurrence condition. The controller 40 may reset the voltage $V_{A1}$ applied to the air blower 18 by adding a first compensation voltage $V_{C1}$ to the reference voltage $V_S$ ($V_{A1}=V_S+V_{C1}$). The first compensation voltage $V_{C1}$ may be set based on the indoor temperature of the passenger compartment that has risen as the defrost outlet 13 is closed. For example, the first compensation voltage $V_{C1}$ may be 1.0V.

When it is determined that the voltage V applied to the mode door actuator 41 is greater than or equal to the second operating voltage $V_2$ in S4, the controller 40 may determine whether the voltage V applied to the mode door actuator 41 is greater than or equal to the second operating voltage $V_2$ and is less than a third operating voltage $V_3$ (S7). The third operating voltage $V_3$ may be a voltage for determining the mix mode. For example, the third operating voltage $V_3$ may be 4.5 V.

When the voltage V applied to the mode door actuator 41 is greater than or equal to the second operating voltage $V_2$ and is less than the third operating voltage $V_3$, the controller 40 may recognize that the HVAC system 10 operates in the mix mode (S8).

After the HVAC system 10 is recognized as operating in the mix mode, the controller 40 may reduce an opening degree of the defrost outlet 13 and increase a voltage applied to the air blower 18 (S9), thereby controlling the HVAC system 10 to operate in a modified mix mode. The controller 40 may control the defrost mode door 33 to relatively reduce the opening degree of the defrost outlet 13, thereby relatively reducing the flow rate of air directed toward the front windshield 5 of the vehicle through the defrost outlet 13. That is, as the flow rate of air directed toward the front windshield 5 is relatively reduced, a phenomenon that the high-temperature high-humidity air which is present outside the vehicle condenses on the exterior of the front windshield 5 may be minimized, and thus the occurrence of external condensation may be minimized. As the opening degree of the defrost outlet 13 is reduced and the flow rate of air directed into the passenger compartment is relatively reduced, an indoor temperature in the passenger compartment may rise above a set cooling temperature. That is, the indoor temperature in the passenger compartment may not be kept at the set cooling temperature. To cope with this, the controller 40 may reduce the opening degree of the defrost outlet 13 and increase the voltage applied to the air blower 18 to increase the RPM of the air blower 18 so that the indoor temperature in the passenger compartment may be kept at the set cooling temperature. Specifically, the controller 40 may reset an opening degree OP of the defrost outlet 13 to be less than a reference opening degree $OP_S$. The reference opening degree $OP_S$ may be an opening degree of the defrost outlet 13 which has been set when the driving condition of the vehicle does not meet the external condensation occurrence condition. The controller 40 may reset the opening degree OP of the defrost outlet 13 by subtracting a compensation opening degree $OP_C$ from the reference opening degree $OP_S$ ($OP=OP_S-OP_C$). The compensation opening degree $OP_C$ may be set based on the indoor temperature of the passenger compartment that has risen as the opening degree of the defrost outlet 13 is reduced. The controller 40 may reset a voltage $V_{A2}$ applied to the air blower 18 to be greater than the reference voltage $V_S$, and accordingly the RPM of the air blower 18 may be increased. The reference voltage $V_S$ may be applied to the air blower 18 when the driving condition of the vehicle does not meet the external condensation occurrence condition. The controller 40 may reset the voltage $V_{A2}$ applied to the air blower 18 by adding a second compensation voltage $V_{C2}$ to the reference voltage $V_S$ ($V_{A2}=V_S+V_{C2}$). The second compensation voltage $V_{C2}$ may be set based on the indoor temperature of the passenger compartment that has risen as the opening degree of the defrost outlet 13 is reduced. For example, the second compensation voltage $V_{C2}$ may be 1.0 V.

As at least a portion of the air is directed toward the front windshield 5 through the defrost outlet 13 in the mix mode, external condensation may occur on the exterior of the front windshield, and accordingly the driver may manually operate a windshield wiper 5a to remove the external condensation from the exterior of the front windshield 5. The controller 40 may detect whether the windshield wiper 5a is manually operated (S10). When it is detected that the windshield wiper 5a is manually operated, the controller 40 may control the windshield wiper 5a to automatically operate at a first time interval (e.g., 45 seconds) (S11). For example, the windshield wiper may operate automatically once every 45 seconds.

When it is determined when the voltage V applied to the mode door actuator 41 is greater than or equal to the third operating voltage $V_3$ in S7, the controller 40 may recognize that the HVAC system 10 operates in the defrost mode (S12).

After the HVAC system 10 is recognized as operating in the defrost mode, the controller 40 may open the defrost outlet 13 and the floor outlet 15, and increase a voltage applied to the air blower 18 (S13), thereby controlling the HVAC system 10 to operate in a modified defrost mode. The controller 40 may control the floor mode door 35 and the defrost mode door 33 to adjust an opening degree of the floor outlet 15 to be less than an opening degree of the defrost outlet 13. In the defrost mode, a portion of the air may be directed toward the floor 6 of the vehicle through the floor outlet 15, which may relatively reduce the flow rate of air directed toward the front windshield 5 through the defrost outlet 13. That is, as the flow rate of air directed toward the front windshield 5 is relatively reduced, a phenomenon that the high-temperature high-humidity air which is present outside the vehicle condenses on the exterior of the front windshield 5 may be minimized, and thus the occurrence of external condensation may be minimized. As the flow rate of air directed toward the front windshield 5 through the defrost outlet 13 is relatively reduced, an indoor temperature in the passenger compartment may rise above a set cooling temperature. That is, the indoor temperature in the passenger compartment may not be kept at the set cooling temperature. To cope with this, the controller 40 may increase the voltage applied to the air blower 18 to increase the RPM of the air blower 18 so that the indoor temperature in the passenger compartment may be kept at the set cooling temperature. Specifically, the controller 40 may control the floor mode door 35 to open the floor outlet 15 with an opening degree less than the opening degree of the defrost outlet 13. The controller 40 may reset a voltage $V_{A3}$ applied to the air blower 18 to be greater than the reference voltage $V_S$, and accordingly the RPM of the air blower 18 may be increased. The reference voltage $V_S$ may be applied to the air blower 18 when the driving condition of the vehicle does not meet the external condensation occurrence condition. The controller 40 may reset the voltage $V_{A3}$ applied to the air blower 18 by adding a third compensation voltage $V_{C3}$ to the reference voltage $V_S$ ($V_{A3}=V_S+V_{C3}$). The third compensation voltage $V_{C3}$ may be set based on the indoor temperature of the passenger compartment that has risen as the floor outlet 15 is opened with the opening degree less than the opening degree of the defrost outlet 13. For example, the third compensation voltage $V_{C3}$ may be 1.0V.

In the defrost mode, as most of the air is directed toward the front windshield 5 even though at least a portion of the air is directed toward the floor 6 of the vehicle through the floor outlet 15, external condensation may occur on the exterior of the front windshield, and accordingly the driver may manually operate the windshield wiper 5a to remove the external condensation from the exterior of the front windshield 5. The controller 40 may detect whether the windshield wiper 5a is manually operated (S14). When it is detected that the windshield wiper 5a is manually operated, the controller 40 may control the windshield wiper 5a to automatically operate at a second time interval (e.g., 30 seconds) (S15). For example, the windshield wiper may operate automatically once every 30 seconds.

As set forth above, when the HVAC system operates in the cooling mode in a case in which the driving condition of the vehicle meets the external condensation occurrence condition, the method of controlling the HVAC system according to exemplary embodiments of the present disclosure may prevent or minimize external condensation without degrading the cooling performance of the passenger compartment by closing the defrost outlet or minimizing the opening degree of the defrost outlet.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method of controlling an automotive heating, ventilation, and air conditioning (HVAC) system, the method comprising:
   in response to determining that a driving condition of a vehicle meets an external condensation occurrence condition, comparing, by a controller, a voltage applied to a mode door actuator with a first operating voltage, a second operating voltage, and a third operating voltage; and
   in response to determining that the voltage applied to the mode door actuator is greater than or equal to the first operating voltage, controlling, by the controller, a defrost mode door to close a defrost outlet or adjust an opening degree of the defrost outlet to be less than a reference opening degree, and in response to determining that the driving condition of a vehicle does not meet an external condensation occurrence condition, terminating the method, wherein the first operating voltage is less than the second operating voltage, wherein the second operating voltage is less than the third operating voltage, wherein the defrost outlet is configured to direct air toward a front windshield of the vehicle, wherein the defrost mode door adjusts the opening degree of the defrost outlet, wherein the mode door actuator actuates the defrost mode door, and wherein the reference opening degree is an opening degree of the defrost outlet which has been set when in a state that the driving condition of the vehicle does not meet the external condensation occurrence condition.

2. The method according to claim 1, wherein in response to determining that the voltage applied to the mode door actuator is greater than or equal to the first operating voltage and is less than the second operating voltage, controlling, by the controller, the defrost mode door to close the defrost outlet.

3. The method according to claim 2, further comprising setting a target temperature of an evaporator to be lower than a reference target temperature, wherein the reference target temperature is set when the driving condition of the vehicle does not meet the external condensation occurrence condition.

4. The method according to claim 2, further comprising setting a voltage applied to an air blower to be greater than a reference voltage, wherein the reference voltage is applied to the air blower when the driving condition of the vehicle does not meet the external condensation occurrence condition.

5. The method according to claim 1, wherein in response to determining that the voltage applied to the mode door actuator is greater than or equal to the second operating voltage and is less than the third operating voltage, controlling, by the controller, the defrost mode door to adjust the opening degree of the defrost outlet to be less than the reference opening degree.

6. The method according to claim 5, further comprising setting a voltage applied to an air blower to be greater than a reference voltage, wherein the reference voltage is applied to the air blower when the driving condition of the vehicle does not meet the external condensation occurrence condition.

7. The method according to claim 5, further comprising:
detecting, by the controller, whether a windshield wiper is manually operated; and
controlling, by the controller, the windshield wiper to automatically operate at a first time interval when it is detected that the windshield wiper is manually operated.

8. The method according to claim 1, further comprising controlling, by the controller, a floor mode door and the defrost mode door to adjust an opening degree of a floor outlet to be less than the opening degree of the defrost outlet when the voltage applied to the mode door actuator is greater than or equal to the third operating voltage, wherein the floor outlet is configured to direct the air toward a floor of the vehicle, the floor mode door adjusts the opening degree of the floor outlet, and the mode door actuator actuates the floor mode door.

9. The method according to claim 8, further comprising setting a voltage applied to an air blower to be greater than a reference voltage, wherein the reference voltage applied to the air blower when the driving condition of the vehicle does not meet the external condensation occurrence condition.

10. The method according to claim 8, further comprising:
detecting, by the controller, whether a windshield wiper is manually operated; and
controlling, by the controller, the windshield wiper to automatically operate at a second time interval when it is detected that the windshield wiper is manually operated.

* * * * *